June 11, 1929.  J. T. RAMSDEN  1,717,119
MOLDING MACHINE
Filed Jan. 3, 1928  2 Sheets-Sheet 2
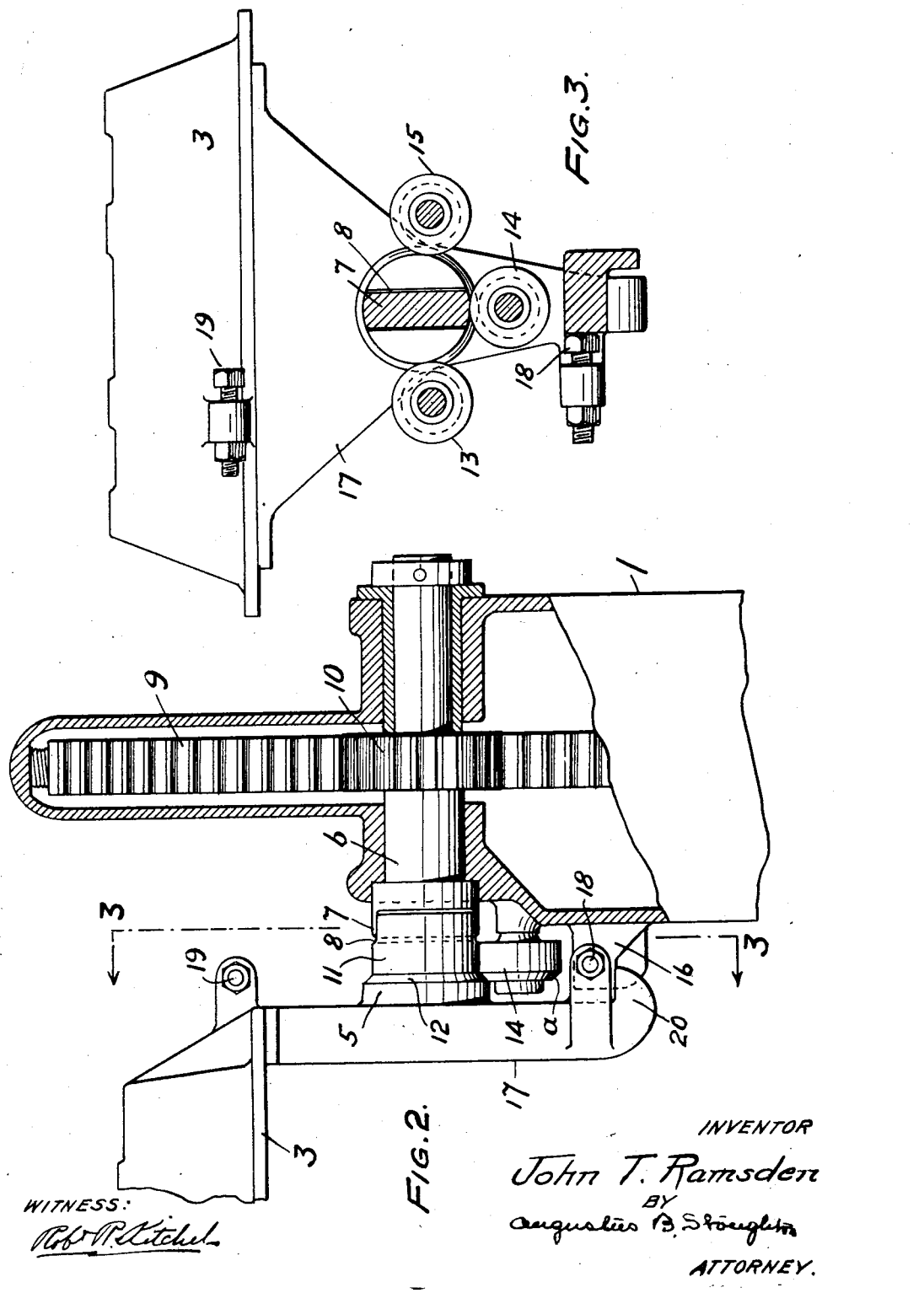
INVENTOR
John T. Ramsden
BY
Augustus B. Stoughton
ATTORNEY.
WITNESS:
Rob't P. Kitchel Patented June 11, 1929.

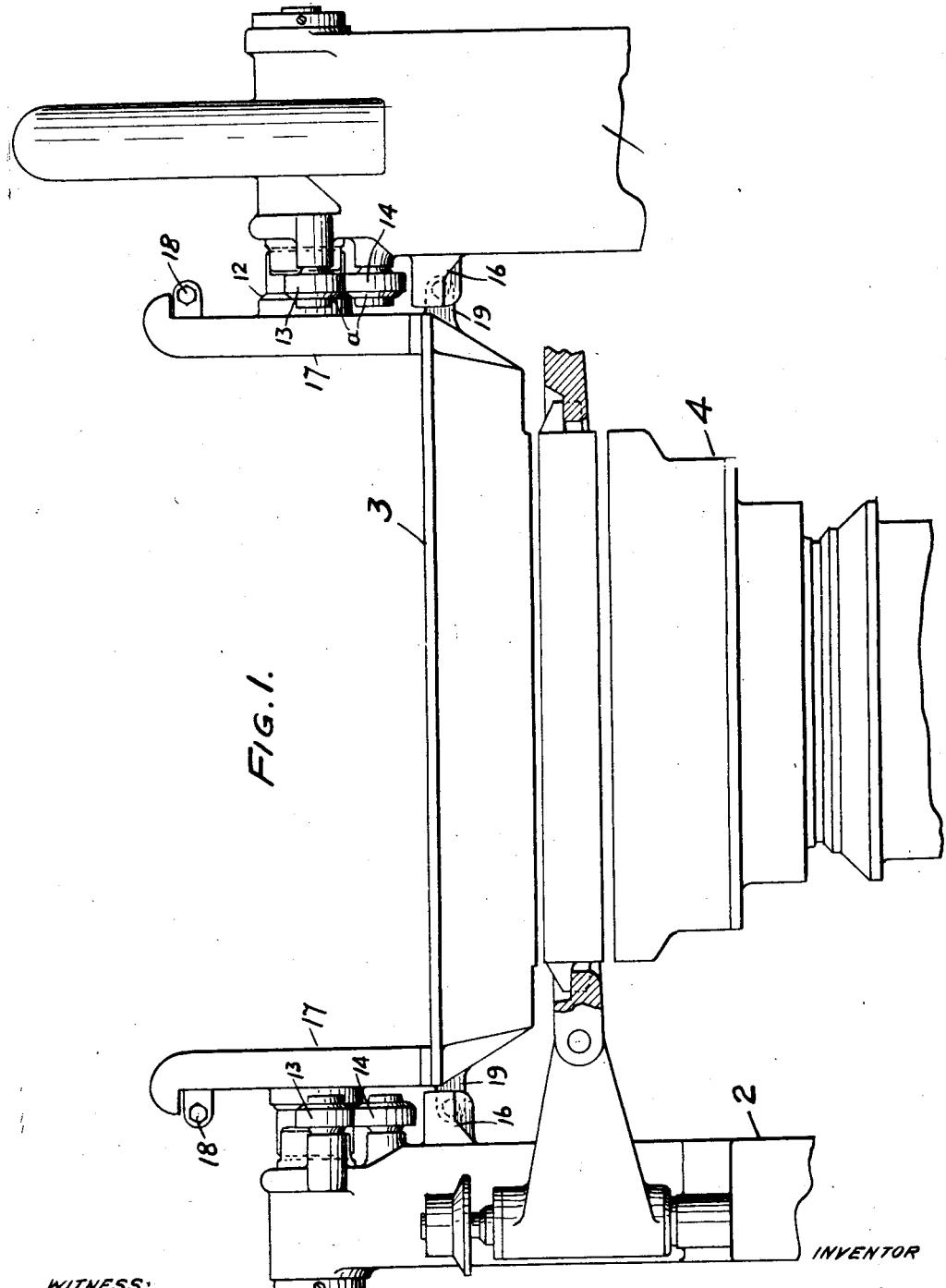

1,717,119

UNITED STATES PATENT OFFICE.

JOHN T. RAMSDEN, OF PHILADELPHIA, PENNSYLVANIA, ASSIGNOR TO THE TABOR MANUFACTURING COMPANY, A CORPORATION OF PENNSYLVANIA.

MOLDING MACHINE.

Application filed January 3, 1928. Serial No. 244,197.

The present invention relates more particularly to a trunnion structure for molding machines of the type in which a table or carrier is rolled over and also raised and lowered.

The principal object of the present invention is to provide an improved, simplified and efficient trunnion structure for use in the character of machine described; another object of the invention is to provide a trunnion structure of such a character that it will operate successfully without a sand guard; another object of the invention is to provide for centering the table automatically by the construction of the trunnion structure; another object of the invention is to provide for holding the table when inverted against upward movement so that it can be used as a ramming head; and other objects will appear from the following description at the end of which the invention will be claimed.

The invention will be first described in connection with the accompanying drawings forming part hereof and in which Figure 1 is a side view of such parts of a molding machine as are necessary for an understanding of the present invention showing the latter embodied therein.

Fig. 2 is a view drawn to an enlarged scale and partly in section of the parts of the structure shown at the righthand side in Fig. 1 with the table inverted, and Fig. 3 is a sectional view taken on the line 3—3 of Fig. 2.

Referring to he drawings 1 and 2 represent portions of the frame or support of a molding machine, and 3 indicates the rollover ramming table. 4 represents means for jarring the table 3 or otherwise imparting to it proper up and down motion for ramming. The means 4 may also serve to ram a mold against the table 3 when in inverted position, Fig. 2, as a ramming head. A description will now be given of the trunnion structure. 5 and 6 are clutch elements and between them there is a connection consisting of a tongue 7 and a groove 8. The clutch element 6 is a shaft journalled for rotation in the support 1 and adapted to be turned through 180° by appropriate mechanism such as the rack 9 and pinion 10. The clutch element 5 is provided with a drum 11 having a beveled extension 12 and it is a provision of the table 3. There are at least three rolls 13, 14 and 15, and they are arranged at the apexes of an isosceles triangle and are connected for rotation, each around its own axis, with the support 1, or, stated in another way, they are arranged in the lower segment of an arc of a circle of which the center is somewhat below the center of the clutch element 6. Each of the rolls 13 and 14 and 15 is provided with a beveled end $a$, and the beveled ends $a$ are opposed in direction with the beveled extension 12 so that considering both sides of the machine the beveled surfaces operate to center or hold the table 3 against sidewise motion. There is provided on the part 1 a stop 16. The table 3 includes an arm 17, and on the arm 17 there is a stop 18, shown as screw threaded and adjustable, and it bears upon the stop 16 to insure accurate positioning of the table 3 in inverted position. The stop 19, shown as screw threaded and adjustable, on the table serves to insure accurate positioning of the same in normal position, Fig. 1. The arm 17 includes a hook 20 which takes under the stop 16 when the table 3 is in inverted position, Fig. 3, and serves to prevent upward movement of the table.

In use the tongue or key 7, when the table is in normal position, Fig. 1, by sliding in the groove 8 permits the table to be lifted vertically and when the table is lifted the drum 11 is lifted out of contact with the rolls 13, 14 and 15. Such operation occurs with jar ramming. When the parts are in the position shown in Figs. 1 and 3 the table may be turned or rolled over, and when this is done the drum 11 rides on the rollers 13, 14 and 15, and the turning movement of the table is arrested by the stops 18 and 1 in position with the hooks 20 in engagement with the stops 16 and then the hooks and stops hold the table down with the drum on the rolls 13, 14 and 15, so that the table is available for use as a ramming head.

It will be obvious to those skilled in the art to which the invention relates that modifications may be made in details of construction and arrangement and in matters of mere form without departing from the spirit of the invention which is not limited to such matters of otherwise than the prior art and the appended claims may require.

I claim:

1. In a molding machine having a support and a table and means for turning and means for raising and lowering the table in respect to the support, a trunnion structure comprising the combination of a tongue and groove clutch element for turning the table and for affording it freedom for rising and falling movements, and of three rolls arranged in the lower segment of an arc of a circle and a drum adapted to seat and to turn on said rolls and to be raised and lowered through the space above them.

2. In a molding machine having a support and a table and means for turning and means for raising and lowering the table in respect to the support, a trunnion structure comprising the combination of a tongue and groove clutch element for turning the table and for affording it freedom for rising and falling movements, and of three rolls arranged in the lower segment of an arc of a circle and a drum adapted to seat and to turn on said rolls and to be raised and lowered through the space above them, said drum and roll having beveled surfaces.

3. In a molding machine having a support and a table and means for turning and means for raising and lowering the table in respect to the support, a trunnion structure comprising the combination of a tongue and groove clutch element for turning the table and for affording it freedom for rising and falling movements, and of three rolls arranged in the lower segment of an arc of a circle and a drum adapted to seat and to turn on said rolls and to be raised and lowered through the space above them, a stop for the support, and a pair of stops connected with the table for cooperation with the first mentioned stop and adapted to position the table in normal and in inverted position.

4. In a molding machine having a support and a table and means for turning and means for raising and lowering the table in respect to the support, a trunnion structure comprising the combination of a tongue and groove clutch element for turning the table and for affording it freedom for rising and falling movements, and of three rolls arranged in the lower segment of an arc of a circle and a drum adapted to seat and to turn on said rolls and to be raised and lowered through the space above them, a stop on the support, and an arm on the table provided with a hook adapted to engage the stop when the table is inverted.

JOHN T. RAMSDEN.